US009661570B2

(12) United States Patent
Klockar et al.

(10) Patent No.: US 9,661,570 B2
(45) Date of Patent: May 23, 2017

(54) NETWORK NODE AND A METHOD THEREIN FOR CONTROLLING UPLINK POWER CONTROL

(75) Inventors: Lars Klockar, Rättvik (SE); Fredric Kronestedt, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 10 days.

(21) Appl. No.: 14/406,293

(22) PCT Filed: Jul. 2, 2012

(86) PCT No.: PCT/SE2012/050763
§ 371 (c)(1),
(2), (4) Date: Dec. 8, 2014

(87) PCT Pub. No.: WO2014/007691
PCT Pub. Date: Jan. 9, 2014

(65) Prior Publication Data
US 2015/0181519 A1   Jun. 25, 2015

(51) Int. Cl.
H04B 7/00   (2006.01)
H04W 52/02   (2009.01)
(Continued)

(52) U.S. Cl.
CPC ..... *H04W 52/0212* (2013.01); *H04W 52/146* (2013.01); *H04W 52/242* (2013.01);
(Continued)

(58) Field of Classification Search
None
See application file for complete search history.

(56) References Cited

U.S. PATENT DOCUMENTS

| | | |
|---|---|---|
| 2009/0042596 A1 | 2/2009 | Yavuz et al. |
| 2012/0071200 A1 | 3/2012 | Bienas et al. |
| | (Continued) | |

FOREIGN PATENT DOCUMENTS

| | | |
|---|---|---|
| EP | 2373107 A1 | 10/2011 |
| WO | 2010006909 A1 | 1/2010 |
| WO | 2013112082 A1 | 8/2013 |

OTHER PUBLICATIONS

Written Opinion of the International Searching Authority, International application No. PCT/SE2012/050075. Date of mailing: Feb. 18, 2013. ISA, Stockholm, Sweden.

*Primary Examiner* — Mohammed Rachedine
(74) *Attorney, Agent, or Firm* — Coats & Bennett, P.L.L.C.

(57) ABSTRACT

A Network Node and a method therein for controlling uplink power control are provided. The method comprises collecting (210) measurement reports from UEs. The method comprises creating (220) clusters of low power RBS(s) and macro RBS(s), wherein each cluster comprises one low power RBS and at least one macro RBS; and identifying (230) the macro RBS with the lowest pathloss for those UEs connected to the low power RBS and the level of the pathloss. The method comprises determining (240) an interference level in the low power RBS caused by UEs connected to the macro RBS for those UEs connected to the macro RBS. Further, the method comprises selecting (250) uplink power control setting for the low power RBS based on the size of the pathloss associated with the identified macro RBS and the interference level in the low power RBS caused by UEs being connected to the macro RBS.

29 Claims, 7 Drawing Sheets

(51) Int. Cl.
*H04W 52/14* (2009.01)
*H04W 52/24* (2009.01)

(52) U.S. Cl.
CPC ....... *H04W 52/243* (2013.01); *H04W 52/244* (2013.01); *H04W 52/245* (2013.01); *Y02B 60/50* (2013.01)

(56) References Cited

U.S. PATENT DOCUMENTS

2012/0115498 A1* 5/2012 Kim .................... H04W 52/244
                                                     455/452.2
2012/0213109 A1* 8/2012 Xu ........................ H04B 7/024
                                                     370/252
2013/0040675 A1    2/2013 Antò et al.

\* cited by examiner

NETWORK NODE AND A METHOD THEREIN FOR CONTROLLING UPLINK POWER CONTROL

TECHNICAL FIELD

The present disclosure relates to radio resource control and in particular to controlling uplink power control for user equipments being served by low power radio base stations.

BACKGROUND

A radio access network of a wireless or cellular communication network comprises a plurality of radio base stations, RBSs, distributed over an area. The area may be a region, a city, a country or several countries. Generally, each RBS is associated with a coverage area which is commonly referred to as a cell.

In a wireless or cellular communication network, users having user equipments, UEs, may move around causing the traffic load in each cell or RBS to vary over time. As a result, some RBSs may experience very heavy traffic loads at certain times.

The geography of a wireless or cellular communication network may vary from cell to cell and also within a cell. For example, in a city there may be buildings of different heights and sizes, there may be roads or streets of different sizes and constitutions from cell to cell and also within a single cell.

Due to the variations in traffic loads over time, there may be certain areas, e.g. within a cell, which suffer from either a traffic load exceeding the capacity of the RBS of that cell, e.g. due to a large number of users at these certain areas. Due to the variations in geography, there may be certain areas, e.g. within a cell, which suffer from poor coverage, e.g. due to radio shadow caused by a building or the like.

One way to cope with these problems and to be able to provide services to users to the largest extent possible, low power RBSs are employed. A low power RBS is a RBS which has substantially lower transmit power than a regular RBS. A regular RBS is also referred to as a macro RBS. A low power RBS has a much smaller coverage area, or cell, than a macro RBS due to its reduced transmit power. The cell of a macro RBS is also referred to as a macro cell and the cell of a low power RBS is also referred to as a low power cell. A low power RBS are also referred to as a micro, pico, femto RBS depending on its transmit power. The plurality of macro RBSs and the low power RBSs may have whole or partly overlapping coverage areas. Often, a low power RBS may be placed within the coverage area of a macro RBS. The deployment of macro RBSs and low power RBSs are also called Heterogeneous network deployment or HetNet.

Figure 1A:
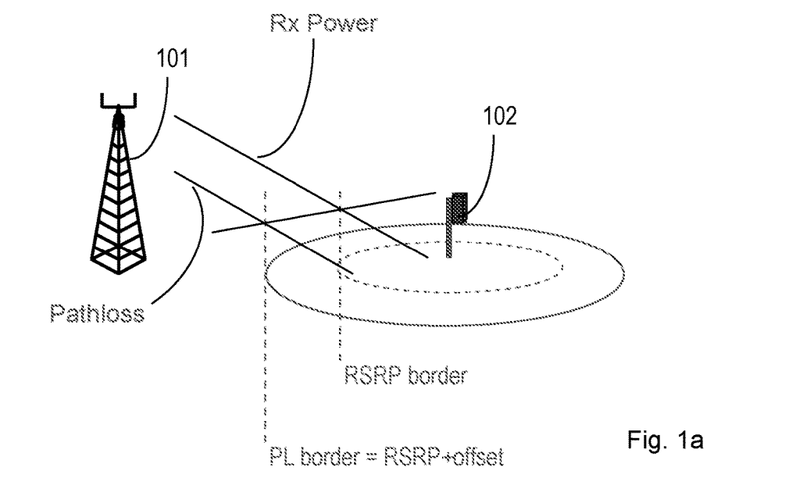
FIG. 1a is a schematic illustration of a macro radio base station and a low power radio base station.

The HetNet deployment may also be used to handle a large traffic growth wherein low power RBS are added to increase capacity of the radio access network of the wireless or cellular communication network. The HetNet deployment may also be used to extend network coverage to areas with no macro coverage. The output power from the low power RBSs, having small cells or coverage areas, is typically several times smaller compared to the macro RBSs and this difference creates an imbalance between the uplink and downlink. A network with a large difference in output power among the cells will have different optimum cell borders for uplink and downlink as indicated in FIG. 1a. FIG. 1a is a schematic illustration of a macro radio base station and a low power radio base station.

From FIG. 1a, it is shown that a macro user, i.e. a UE currently being served by the macro RBS but located at the cell edge or border between the macro and the low power RBS will have a lower pathloss to the low power RBS and may therefore cause a lot of interference to the low power RBS. One way to handle the caused interference is to increase uplink power control target for UE(s) connected to the low power RBS. In order to fully compensate for the difference in downlink output power, the uplink power control target for the low power RBS should be increased with the same amount.

Figure 1B:
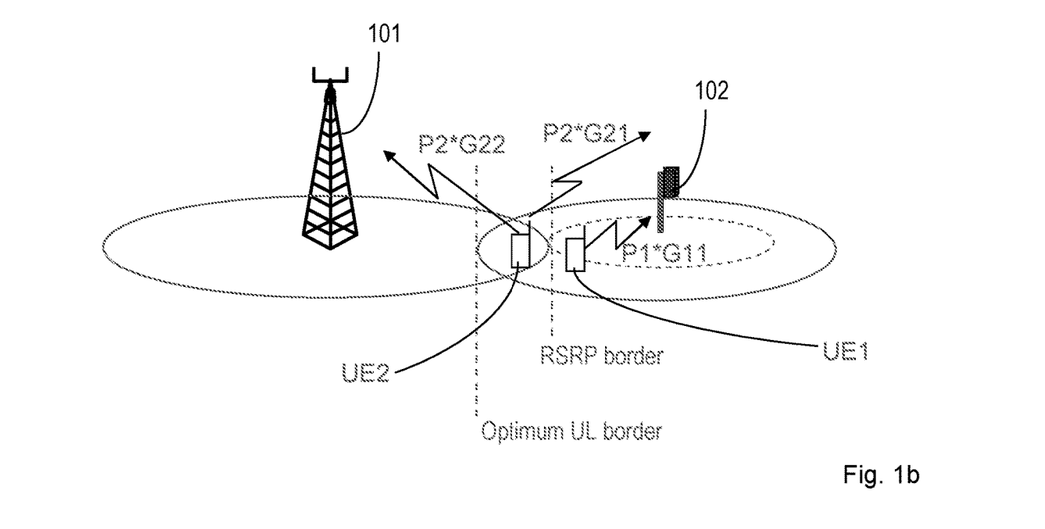
FIG. 1b is a schematic illustration of a user equipment served by a macro radio base station and another user equipment being served by a low power radio base station.

When low power nodes or RBSs are deployed in an existing macro layer using the same frequency, the downlink power imbalance could create problems on the uplink. A macro user, i.e. a UE currently being served by a macro RBS on the cell edge to the low power RBS will adjust its output power to reach a certain signal strength level in the macro cell but due to the downlink imbalance in output power the macro user will have a lower pathloss to the low power RBS and will therefore create a very high interference level in the low power RBS. This is illustrated in FIG. 1b and one straight forward solution to this is to increase the power control target in the low power RBS to match the difference in downlink output power, if the difference in downlink output power between the macro RBS and the small RBS is 13 dB then the uplink power control target in the small cell should be adjusted with 13 dB. So if the default uplink power control target for the macro layer is −103 dBm the uplink power control target for the pico layer should be set to −90 dBm. However, the use of this more aggressive uplink power control target in the small cell may create more interference and may also result in increased drain of batteries in the UEs.

$$SINR_{UE_1} = \frac{P_1 * G_{1_1}}{P_2 * G_{2_1} + N_0} = -13 \text{dB}, \quad (1)$$

where P1 is the uplink transmission power for UE1 connected to the low power RBS 102 and G11 is the gain from UE1 to the low power RBS 102. Further, P2 is the uplink transmission power for UE2 connected to the macro RBS 101 and G21 is the gain from UE2 to the low power RBS 102.

SUMMARY

The object is to obviate at least some of the problems outlined above. In particular, it is an object to provide a Network Node and a method therein for controlling uplink power control within an area comprising at least one macro RBS and at least one low power RBS, wherein the uplink power control setting for the low power RBS is based on the size of the pathloss associated with a macro RBS the lowest pathloss and the interference level in the low power RBS caused by UEs being connected to the macro RBS. These objects and others may be obtained by providing a Network Node and a method in a Network Node according to the independent claims attached below.

According to an aspect a method in a network node in a wireless communication network for controlling uplink power control within an area comprising at least one macro RBS and at least one low power RBS is provided. The method comprises collecting measurement reports from UEs being located within the area. The method further comprises creating clusters of low power RBS(s) and macro RBS(s)

based on the collected measurement reports, wherein each cluster comprises one low power RBS and at least one macro RBS; and identifying the macro RBS with the lowest pathloss based on the collected measurement reports for those UEs being connected to the low power RBS and the level of the pathloss. The method also comprises determining an interference level in the low power RBS caused by UEs being connected to the macro RBS based on the collected measurement reports for those UEs being connected to the macro RBS. Further, the method comprises selecting uplink power control setting for the low power RBS based on the size of the pathloss associated with the identified macro RBS and the interference level in the low power RBS caused by UEs being connected to the macro RBS; and instructing 260 UEs connected to the low power RBS to use the selected uplink power control setting.

According to an aspect a method in a network node in a wireless communication network for controlling uplink power control within an area comprising at least one macro RBS and at least one low power RBS is provided. The method comprises collecting measurement reports from UEs being located within the area. The method further comprises creating clusters of low power RBS(s) and macro RBS(s) based on the collected measurement reports, wherein each cluster comprises one low power RBS and at least one macro RBS. The method further comprises determining an uplink signal quality for the macro RBS based on a received report from the macro RBS; and comparing the uplink signal quality to a previously determined uplink signal quality. The method also comprises adjusting the uplink power control setting for the low power RBS based on the comparison; and instructing UEs connected to the low power RBS to use the adjusted uplink power control setting.

According to an aspect, a Network Node in a wireless communication network adapted to control uplink power control within an area comprising at least one macro Radio Base Station, RBS, and at least one low power RBS is provided. The Network Node comprises a collecting unit adapted to collect measurement reports from UEs being located within the area; and a creating unit adapted to create clusters of low power RBS(s) and macro RBS(s) based on the collected measurement reports, wherein each cluster comprises one low power RBS and at least one macro RBS. The network node further comprises an identifying unit adapted to identify the macro RBS with the lowest pathloss based on the collected measurement reports for those UEs being connected to the low power RBS and the level of the pathloss. Still further, the network node comprises a determining unit adapted to determine an interference level in the low power RBS caused by UEs being connected to the macro RBS based on the collected measurement reports for those UEs being connected to the macro RBS. The network node comprises a selecting unit adapted to select uplink power control setting for the low power RBS based on the size of the pathloss associated with identified macro RBS and the interference level in the low power RBS caused by UEs being connected to the macro RBS; and an instructing unit adapted to instruct UEs connected to the low power RBS to use the selected uplink power control setting.

According to an aspect, a Network Node in a wireless communication network adapted to control uplink power control within an area comprising at least one macro Radio Base Station, RBS, and at least one low power RBS is provided. The Network Node comprises a collecting unit adapted to collect measurement reports from UEs being located within the area; and a creating unit adapted to create clusters of low power RBS(s) and macro RBS(s) based on the collected measurement reports, wherein each cluster comprises one low power RBS and at least one macro RBS. The network node further comprises a determining unit adapted to determine a current uplink signal quality for the macro RBS based on a received report from the macro RBS. The network node also comprises a comparing unit adapted to compare the current uplink signal quality to a previously determined uplink signal quality. Still further, the network node comprises an adjusting unit adapted to adjust a current uplink power control setting for the low power RBS based on the comparison; and an instructing unit adapted to instruct UEs connected to the low power RBS to use the adjusted uplink power control setting.

The Network Node and the methods therein have several advantages. It may be possible to lower the interference level in the communication system and the total system capacity may be increased. It may also be possible to reduce the battery consumption for the UEs connected to the low power RBS.

BRIEF DESCRIPTION OF DRAWINGS

Embodiments will now be described in more detail in relation to the accompanying drawings, in which.

DETAILED DESCRIPTION

Briefly described, exemplifying embodiments of a network node and a method therein are provided for controlling uplink power control within an area comprising at least one macro Radio Base Station, RBS, and at least one low power RBS. In short, clusters of low power RBS(s) and macro RBS(s) are created based on collected measurement reports from UEs; the level of the pathloss is identified and an interference level in the low power RBS is determined. Based on this, uplink power control setting is selected for the low power RBS.

An exemplifying embodiment of a method in a network node in a wireless communication network for controlling uplink power control within an area comprising at least one macro RBS and at least one low power RBS will now be described with reference to FIG. 2, which is a flowchart of a method in a network node in a wireless communication network for controlling uplink power control according to an exemplifying embodiment.

Figure 2:
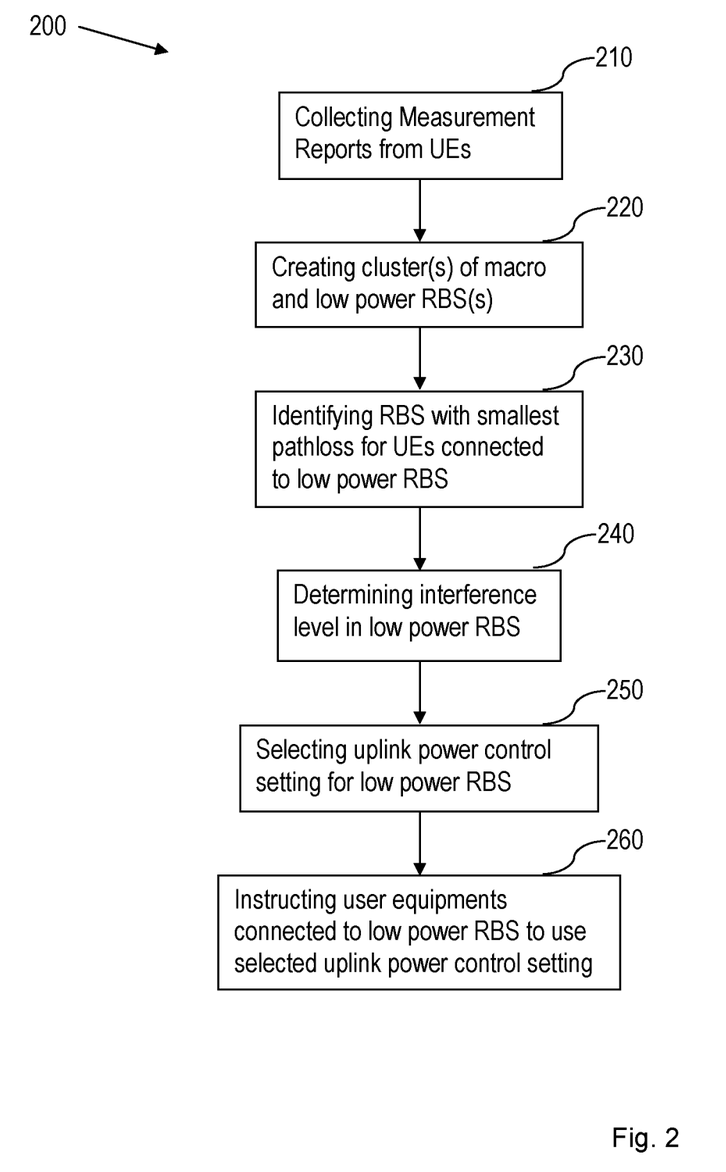
FIG. 2 is a flowchart of a method in a network node in a wireless communication network for controlling uplink power control according to an exemplifying embodiment.

FIG. 2 illustrates the method comprising collecting 210 measurement reports from UEs being located within the area. The method further comprises creating 220 clusters of low power RBS(s) and macro RBS(s) based on the collected measurement reports, wherein each cluster comprises one low power RBS and at least one macro RBS; and identifying 230 the macro RBS(s) with the lowest pathloss based on the collected measurement reports for those UEs being connected to the low power RBS and the level of the pathloss. The method also comprises determining 240 an interference level in the low power RBS caused by UEs being connected to the macro RBS based on the collected measurement reports for those UEs being connected to the macro RBS. Further, the method comprises selecting 250 uplink power control setting for the low power RBS based on the size of the pathloss associated with the identified macro RBS and the interference level in the low power RBS caused by UEs being connected to the macro RBS; and instructing 260 UEs connected to the low power RBS to use the selected uplink power control setting.

In the above exemplifying embodiment of the method, an area comprises at least one macro RBS and at least one low power RBS. The low power RBSs may by any of a micro, pico, femto, or relay RBS and any mixture between the different types of low power RBSs. Further, in this area, a plurality of UEs are located and each individual UE is connected to one of the at least one macro RBS and the at least one low power RBS. When a UE is connected to an RBS, the UE may be provided with services from the wireless or cellular communication network. There may be UEs present in the area which are not connected to any RBS meaning that they are not making use of any service from the network.

The connected UEs will receive signalling of some sort from the RBSs to which they are connected and each UE will perform at least one measurement regarding the received strength or quality of the received signalling and report the measurement(s) to the RBS which they are connected to.

A UE may also receive signalling from neighbouring RBSs to which they are not connected, perform measurements regarding the received strength or quality of the received signalling from those RBSs from which they receive the signalling and send measurement reports about those RBSs too, in addition to the RBS to which each individual UE is connected as is described directly above.

The method in the network node comprises collecting all these measurement reports from the UEs present in the area in which uplink power control is to be controlled.

Once the network node has collected all these measurement reports from the UEs, the method comprises creating clusters of one low power RBS and macro RBS(s) based on the collected measurement reports. Each cluster will comprise one low power RBS and at least one macro RBS. Generally, there will be about the same amount of clusters as there are number of low power RBSs in the area in which resource distribution is to be controlled. However, there may be low power RBSs which will not be clustered together with any macro RBS, hence there may be fewer clusters than there are low power RBSs. In more detail, the low power RBS is clustered with those macro RBSs which have the low power RBS as a neighbour. The measurement reports from the UEs connected to macro RBSs are analysed. From the measurement reports the neighbouring low power RBS may be identified.

Then, for each low power RBS in the respective clusters, the method comprises identifying the macro RBS(s) with the lowest pathloss based on the collected measurement reports for those UEs being connected to the low power RBS and the level of the pathloss. In order to perform this identification of the macro with the lowest pathloss, the output power of the respective macro RBSs is known to the network node. The measurement reports from the UEs indicate the downlink received power, and in order to determine the pathloss, the network node needs both the output power of the respective macro RBSs and the received power by the UEs. The identified macro RBS is the RBS for which the low power RBS would case the most uplink interference towards.

The method also comprises determining an interference level in the low power RBS caused by UEs being connected to the macro RBS based on the collected measurement reports for those UEs being connected to the macro RBS. This may be done in two ways. One example is to analyse the received measurement reports from UE in macro RBS. Statistics of pathloss to low power RBSs are determined and indicate strong interference from macro users, i.e. a UE connected to the macro RBS, to the low power RBS. At the same time, statistics of pathloss towards the serving macro RBS is determined, which will indicate if UE needs high power to reach the macro RBS.

A pathloss ratio can for example be defined as $R=G\_low\_power\_RBS/G\_macro\_RBS$ where $G\_low\_power\_RBS$ is pathloss from a macro UE to the low power RBS and $G\_macro\_RBS$ is pathloss from the macro UEs to the serving macro RBS. A high value of R implies potential strong interference towards low power RBS since pathloss to the low power RBS is small and the macro UE is far from the macro RBS and needs to use high transmit power. The amount of traffic in the macro RBS can be considered by weighting the pathloss or R factor.

Further, the method comprises selecting uplink power control setting for the low power RBS based on the size of the pathloss associated with the identified macro RBS and the interference level in the low power RBS caused by UEs being connected to the macro RBS.

The uplink power control setting, P0, may be selected in different ways. For example, the low power RBS interferes with macro RBS but the macro RBS does not cause interference to the low power RBS➔ no need to adjust P0 in the low power RBS (use P0=−103 dBm in the low power RBS). In other words, the pathloss from the low power RBS to the macro RBS is low indicating a high interference from the low power RBS to the macro RBS. Additionally, R is low meaning the macro RBS only causes low interference to the low power RBS.

The low power RBS does not interfere the macro RBS but the macro RBS interferes with the low power RBS➔ need to adjust P0 in the low power RBS (aggressively—use P0=−87 in pico). In other words, the pathloss from the low power RBS to the macro RBS is high indicating a low interference from the low power RBS to the macro RBS. Additionally, R is large meaning the macro RBS causes high interference to the low power RBS.

The low power RBS does not interfere with the macro RBS and the macro RBS does not interfere with the low power RBS➔ no need to adjust P0 in the low power RBS (use P0=−103 in the low power RBS). In other words, the pathloss from the low power RBS to the macro RBS is high indicating a low interference from the low power RBS to the macro RBS. Additionally, R is low meaning the macro RBS only causes low interference to the low power RBS.

The low power RBS interfere with the macro RBS and the macro RBS interferes with the low power RBS➔ need to adjust P0 in the low power RBS (medium compensation to improve performance for the low power RBS but not cause large coverage loss in the macro RBS—use e.g. P0=−97). In other words, the pathloss from the low power RBS to the macro RBS is low indicating a high interference from the low power RBS to the macro RBS. Additionally, R is large meaning the macro RBS causes high interference to the low power RBS.

Once the uplink power control setting for the low power has been selected, the network node instructs UEs connected to the low power RBS to use the selected uplink power control setting.

The method in, or performed by, the network node has several advantages. It may be possible to lower the interference level in the communication system and the total system capacity may be increased. It may also be possible to reduce the battery consumption for the UEs connected to the low power RBS.

According to an embodiment, the measurement reports comprise Reference Signal Received Power, RSRP, and the wireless communication network is employing Long Term Evolution, LTE.

Different Radio Access Technologies, RATs, employ different types for the UEs to measure the signal strength or signal quality. The signal strength or signal quality is most often measured using pilot signals which are sent from the macro and the low power RBSs to the UEs. Depending on the RAT, the signal strength or signal quality may be measured in different ways. When the RAT employs LTE, the measurement reports from the UEs may comprise RSRP.

According to an embodiment, the method further comprises estimating a traffic load in the low power RBS(s), weighting the pathloss associated with identified macro RBS with the estimated traffic load and selecting uplink power control setting for the low power RBS also based on the weighted pathloss.

Statistics of the pathloss from low power RBSs towards the respective macro RBSs may be collected by the network node based on the received measurement reports. The pathloss is in a further example weighted with the amount of traffic in the low power RBS to consider loading effects. An example of a traffic load measure is the air interface utilisation in percentage. If the pathloss is small from low power RBS to macro RBS, meaning a potentially high interference, then the weighted value will be smaller if the utilisation is small, e.g. 10% instead of 100%. Hence, the risk for interference is small since the low power RBS has a low load, e.g. 10% even if the pathloss is small. The pathloss and the values of R are in an example weighted values which will affect the interference situation classification as described above, and possibly the increase or the decrease of P0.

According to yet an embodiment, the method further comprises receiving information relating to the transmission power of the identified macro RBS and determining the pathloss based on the collected measurement reports for those UEs being connected to the low power RBS and the transmission power of the identified macro RBS.

As described above, in order to perform this identification of the macro with the lowest pathloss, the output power of the respective macro RBSs is known to the network node. The measurement reports from the UEs indicate the downlink received power, and in order to determine the pathloss, the network node needs both the output power of the respective macro RBSs and the received power by the UEs. The identified macro RBS is the RBS for which the low power RBS would cause the most uplink interference towards. In this example, the network node receives information relating to the transmission power of the identified macro RBS. The information is in one example transmitted or signalled from the macro RBS to the network node.

According to still an embodiment, the network node is a low power RBS.

In this embodiment, the network node and the low power RBS of each of the clusters are one and the same.

In an embodiment, collecting measurement reports from UEs being located within the area comprises receiving measurement reports from UEs being connected to the low power RBS and receiving measurement reports from UEs being connected to those macro RBS(s) which has a low pathloss to the low power RBS.

In case the low power RBS is the network node in which the method is performed, the low power RBS will collect or receive measurement reports from UEs being connected to the low power RBS. Further, the low power RBS, i.e. the network node, receives measurement reports from UEs being connected to those macro RBS(s) which has a low pathloss to the low power RBS. This means that the macro RBSs in the area identify which one low power RBS has the lowest pathloss for the respective macro RBSs. The macro RBSs then forward the measurement reports they have received from UEs to the respective low power RBS which has the lowest pathloss to the respective low power RBSs. In this manner, the low power RBS, i.e. the network node, receives measurement reports from UEs being connected to the low power RBS and the low power RBS receives measurement reports from UEs being connected to those macro RBS(s) which has the lowest pathloss to the low power RBS.

According to an embodiment, the network node is a Radio Network Controller, RNC, or a Base Station Controller, BSC.

According to yet an embodiment, the network node is an Operation, Administration and Maintenance, OAM, node.

According to still an embodiment, collecting measurement reports from UEs being located within the area comprises receiving measurement reports forwarded by the at least one macro RBS and the at least one low power RBS.

In an example, the low power RBSs in the area receive measurement reports from UEs and possibly also from macro RBSs. The low power RBSs forwards the received measurement reports to the RNC or the BSC. Further, the macro RBSs receives measurement reports from UEs which the macro RBSs either forwards a low power RBS, to the RNC or the BSC, or both. In this manner, the RNC or the BSC collects measurement reports from UEs being located within the area. Thereafter, the RNC or the BSC creates clusters as having been described above and selects uplink power control setting for the low power RBS based on the size of the pathloss associated with the identified macro RBS and the interference level in the low power RBS caused by UEs being connected to the macro RBS.

In an example, measurement reports from UEs are collected in the same manner as measurement reports from UEs are collected by the RNC or the BSC described above. Also in this embodiment, the low power RBSs in the area receive measurement reports from UEs and possibly also from macro RBSs. The low power RBSs forwards the received measurement reports to the OAM node. Further, the macro RBSs receives measurement reports from UEs which the macro RBSs either forwards to a low power RBS, or to the OAM node, or both. In this manner, the OAM node collects measurement reports from UEs being located within the area. Thereafter, the OAM node creates clusters as having been described above and selects uplink power control setting for the low power RBS based on the size of the pathloss associated with the identified macro RBS and the interference level in the low power RBS caused by UEs being connected to the macro RBS.

In yet an embodiment, the creating of clusters of low power RBS(s) and macro RBS(s) comprises identifying, for each low power RBS, the macro RBSs having the lowest pathloss and clustering each respective low power RBS with those macro RBS(s) having the lowest pathloss.

Embodiments herein also relate to a method in a network node in a wireless communication network for controlling uplink power control within an area comprising at least one macro RBS and at least one low power RBS will now be described with reference to FIG. 3, which is a flowchart of a method in a network node in a wireless communication network for controlling uplink power control according to an exemplifying embodiment.

Figure 3:
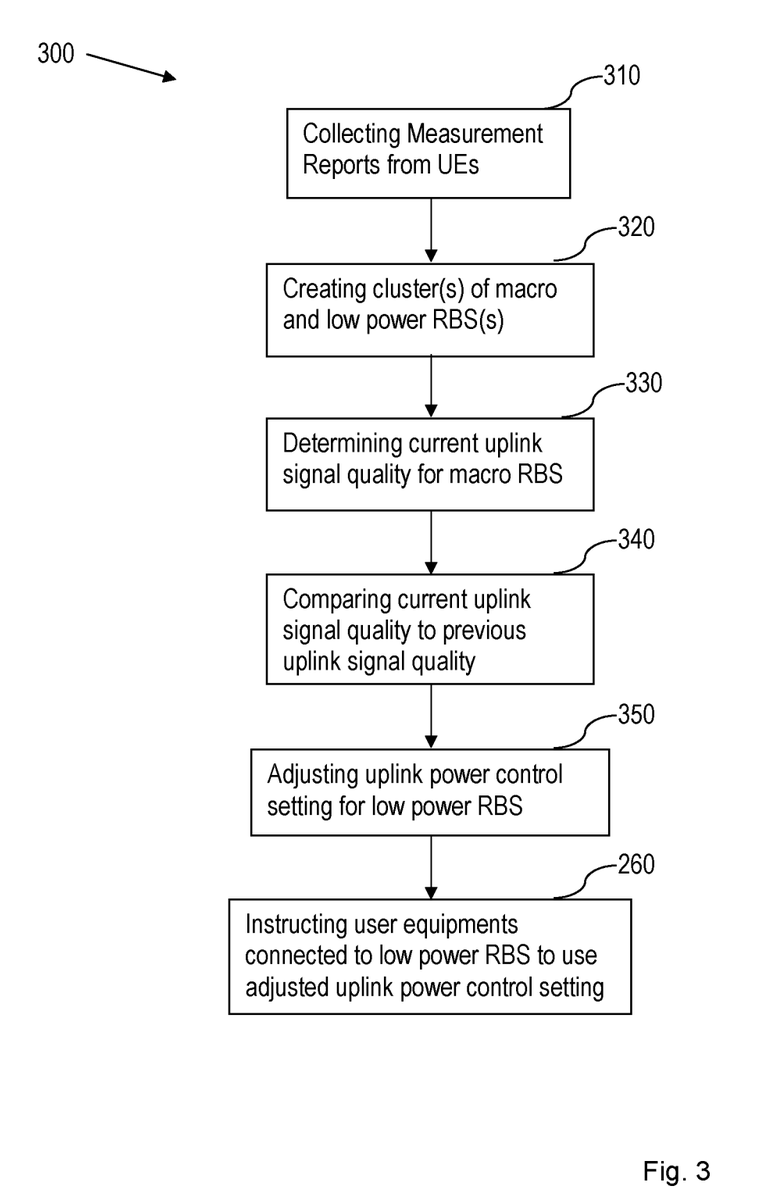
FIG. 3 is a flowchart of a method in a network node in a wireless communication network for controlling uplink power control according to yet an exemplifying embodiment.

FIG. 3 illustrates the method comprising collecting 310 measurement reports from UEs being located within the area. The method further comprises creating 320 clusters of low power RBS(s) and macro RBS(s) based on the collected measurement reports, wherein each cluster comprises one low power RBS and at least one macro RBS. The method further comprises determining 330 an uplink signal quality for the macro RBS based on a received report from the macro RBS; and comparing 340 the uplink signal quality to a previously determined uplink signal quality. The method also comprises adjusting 350 the uplink power control setting for the low power RBS based on the comparison; and instructing 360 UEs connected to the low power RBS to use the adjusted uplink power control setting.

In the above exemplifying embodiment of the method, an area comprises at least one macro RBS and at least one low power RBS. The low power RBSs may by any of a micro, pico, femto, or relay RBS and any mixture between the different types of low power RBSs. Further, in this area, a plurality of UEs are located and each individual UE is connected to one of the at least one macro RBS and the at least one low power RBS. When a UE is connected to an RBS, the UE may be provided with services from the wireless or cellular communication network. There may be UEs present in the area which are not connected to any RBS meaning that they are not making use of any service from the network.

The connected UEs will receive signalling of some sort from the RBSs to which they are connected and each UE will perform at least one measurement regarding the received strength or quality of the received signalling and report the measurement(s) to the RBS which they are connected to.

A UE may also receive signalling from neighbouring RBSs to which they are not connected, perform measurements regarding the received strength or quality of the received signalling from those RBSs from which they receive the signalling and send measurement reports about those RBSs too, in addition to the RBS to which each individual UE is connected as is described directly above.

The method in the network node comprises collecting all these measurement reports from the UEs present in the area in which uplink power control is to be controlled.

Once the network node has collected all these measurement reports from the UEs, the method comprises creating clusters of one low power RBS and macro RBS(s) based on the collected measurement reports. Each cluster will comprise one low power RBS and at least one macro RBS. Generally, there will about be the same amount of clusters as there are number of low power RBSs in the area in which resource distribution is to be controlled. However, there may be low power RBSs which will not be clustered together with any macro RBS, hence there may be fewer clusters than there are low power RBSs.

Then, an uplink signal quality for the macro RBS is determined based on a received report from the macro RBS. This means that the RBS transmits a report to the low power RBS indicating the determined uplink signal quality for the macro RBS. The uplink signal quality is determined by the macro RBS and the time interval over which the macro RBS determines the uplink signal quality may be relatively long, e.g. up to a week. In one example, the uplink signal quality is an average value of the uplink signal quality over the time for which uplink signal quality is determined.

Once the uplink signal quality is determined by the network node, based on the received report from the macro RBS, the network node compares the uplink signal quality to a previously determined uplink signal quality. Since the time interval over which the uplink signal quality is determined may be relatively long, the comparison between the two uplink signal qualities renders a result which is not dependent on relatively short fluctuations of the uplink signal quality.

The method also comprises adjusting 350 the uplink power control setting for the low power RBS based on the comparison; and instructing 360 UEs connected to the low power RBS to use the adjusted uplink power control setting.

It may be that the uplink power control settings have changed between the previously determined uplink signal quality and the uplink signal quality. The change of the uplink power control setting may affect the macro RBS so that the UEs connected to the low power RBS cause increased interference to the macro RBS, e.g. if the uplink power control settings were increased between the two instances, i.e. the previous and the uplink signal quality measurement or evaluation. Alternatively, the UEs connected to the low power RBS cause less interference to the macro RBS, e.g. if the uplink power control settings were decreased between the two instances, i.e. the previous and the uplink signal quality measurement or evaluation. It may also be that due to traffic load, the UEs connected to the low power RBS cause increased or less interference to the macro RBS even if the uplink power control settings have not changed between the two instances. Depending on the outcome of the comparison, the network node may adjust the uplink power control setting for the low power RBS and then instruct the UEs connected to the low power RBS to use the adjusted uplink power control setting.

The method in, or performed by, the network node has several advantages. It may be possible to lower the interference level in the communication system and the total system capacity may be increased. It may also be possible to reduce the battery consumption for the UEs connected to the low power RBS.

According to an embodiment, the method further comprises determining 335 a current uplink signal quality for the low power RBS, wherein adjusting the current uplink power control setting for the low power RBS is also based on the current uplink signal quality for the low power RBS.

In this example, the uplink signal quality for the macro RBS is not the only factor affecting the selection or adjustment of the current uplink power control setting for the low power RBS. Consideration is also taken to the current uplink signal quality for the low power RBS. Both these factors are taken into consideration when adjusting the current uplink power control setting for the low power RBS.

According to still an embodiment, the current uplink power control setting for the low power RBS is adjusted downwards in case the comparison indicates a deteriorated uplink signal quality below a predefined threshold for UEs connected to the macro RBS.

In this embodiment, in case the UEs connected to the macro RBS experience a deteriorated uplink signal quality, the UEs connected to the low power RBS are transmitting with a relatively high output power and are thus causing interference to the UEs connected to the macro RBS. In order to reduce the interference to the UEs connected to the macro RBS caused by the UEs connected to the low power RBS, the uplink power control setting for the low power RBS is adjusted downwards. The predetermined threshold is in an example the interference threshold which has been measured in the macro RBS before the P0 is increased in the low power RBS.

According to yet an embodiment, the current uplink power control setting for the low power RBS is adjusted upwards in case the current uplink signal quality for the low power RBS is below a predefined threshold.

In this example, the current uplink signal quality for the low power RBS is below a predefined threshold. This means that the UEs connected to the low power RBS are severely interfered by the UEs connected to the macro RBS. The result is that they experience difficulties in communicating to the low power RBS and may even not be able to successfully transmit in uplink to the low power RBS. If this is the case, the network node adjusts the uplink power control setting for the low power RBS upwards in order for those UEs to achieve an improved uplink signal quality.

Embodiments herein also relate to a network node in a wireless communication network adapted to control uplink power control within an area comprising at least one macro RBS and at least one low power RBSs. The network node has the same objects, technical features and advantages as the method therein, or performed by the network node. Consequently, the network node will only be described in brief in order to avoid unnecessary repetition.

Figure 4:
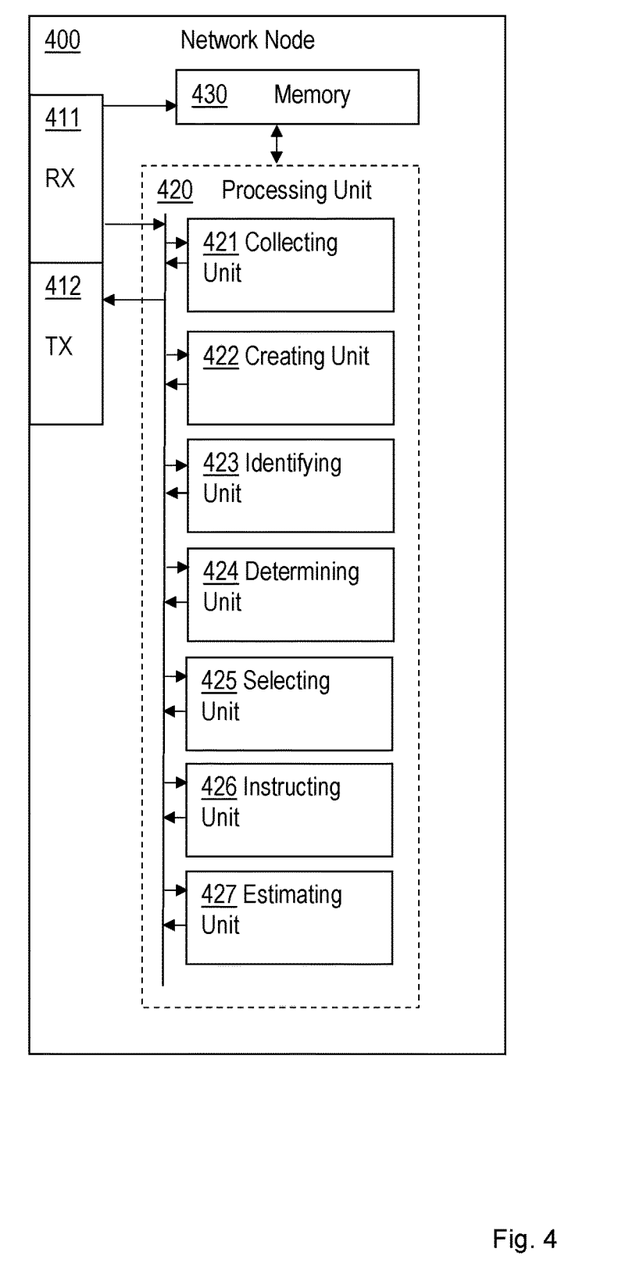
FIG. 4 is a block diagram of a network node adapted to control uplink power control according to an exemplifying embodiment.

FIG. 4 a block diagram of a network node adapted to control uplink power control according to an exemplifying embodiment. FIG. 4 illustrates the network node comprising a collecting unit 421 adapted to collect measurement reports from UEs being located within the area; and a creating unit 422 adapted to create clusters of low power RBS(s) and macro RBS(s) based on the collected measurement reports, wherein each cluster comprises one low power RBS and at least one macro RBS. The network node further comprises an identifying unit 423 adapted to identify the macro RBS(s) with the lowest pathloss based on the collected measurement reports for those UEs being connected to the low power RBS and the level of the pathloss. Still further, the network node comprises a determining unit 424 adapted to determine an interference level in the low power RBS caused by UEs being connected to the macro RBS based on the collected measurement reports for those UEs being connected to the macro RBS. The network node comprises a selecting unit 425 adapted to select uplink power control setting for the low power RBS based on the size of the pathloss associated with identified macro RBS and the interference level in the low power RBS caused by UEs being connected to the macro RBS; and an instructing unit 426 adapted to instruct UEs connected to the low power RBS to use the selected uplink power control setting.

The network node has several advantages. It may be possible to lower the interference level in the communication system and the total system capacity may be increased. It may also be possible to reduce the battery consumption for the UEs connected to the low power RBS.

According to an embodiment, the measurement reports comprise Reference Signal Received Power, RSRP, and the wireless communication network is employing Long Term Evolution, LTE.

According to yet an embodiment, the network node further comprises an estimating unit 427 adapted to estimate a traffic load in the low power RBS(s), and to weight the pathloss associated with identified macro RBS with the estimated traffic load, wherein the selecting unit 425 is adapted to select uplink power control setting for the low power RBS also based on the weighted pathloss.

According to still an embodiment, the collecting unit 421 is adapted to receive information relating to the transmission power of the identified macro RBS, wherein the determining unit is adapted to determine the pathloss based on the collected measurement reports for those UEs being connected to the low power RBS and the transmission power of the identified macro RBS.

According to an embodiment, the network node 400 is a low power RBS.

According to an embodiment, the collecting unit 421 is adapted to receive measurement reports from UEs being connected to the low power RBS and receiving measurement reports from UEs being connected to those macro RBS(s) which has a pathloss to the low power RBS, thereby collecting measurement reports from UEs being located within the area.

According to still an embodiment, the network node is a Radio Network Controller, RNC, or a Base Station Controller, BSC.

According to another embodiment, the network node is an Operation, Administration and Maintenance, OAM, node.

According to an embodiment, the collecting unit 421 is adapted to collect measurement reports from UEs being located within the area by receiving measurement reports forwarded by the at least one macro RBS and the at least one low power RBS.

According to still an embodiment, the creating unit 422 is adapted to create clusters of low power RBS(s) and macro RBS(s) by the identifying unit 423 being adapted to identify, for each low power RBS, the macro RBSs having the lowest pathloss, wherein the creating unit 422 is adapted to cluster each respective low power RBS with those macro RBS(s) having the lowest pathloss.

Embodiments herein also relate to a network node in a wireless communication network adapted to control uplink power control within an area comprising at least one macro RBS and at least one low power RBSs. The network node has the same objects, technical features and advantages as the method therein, or performed by the network node. Consequently, the network node will only be described in brief in order to avoid unnecessary repetition.

Figure 5:
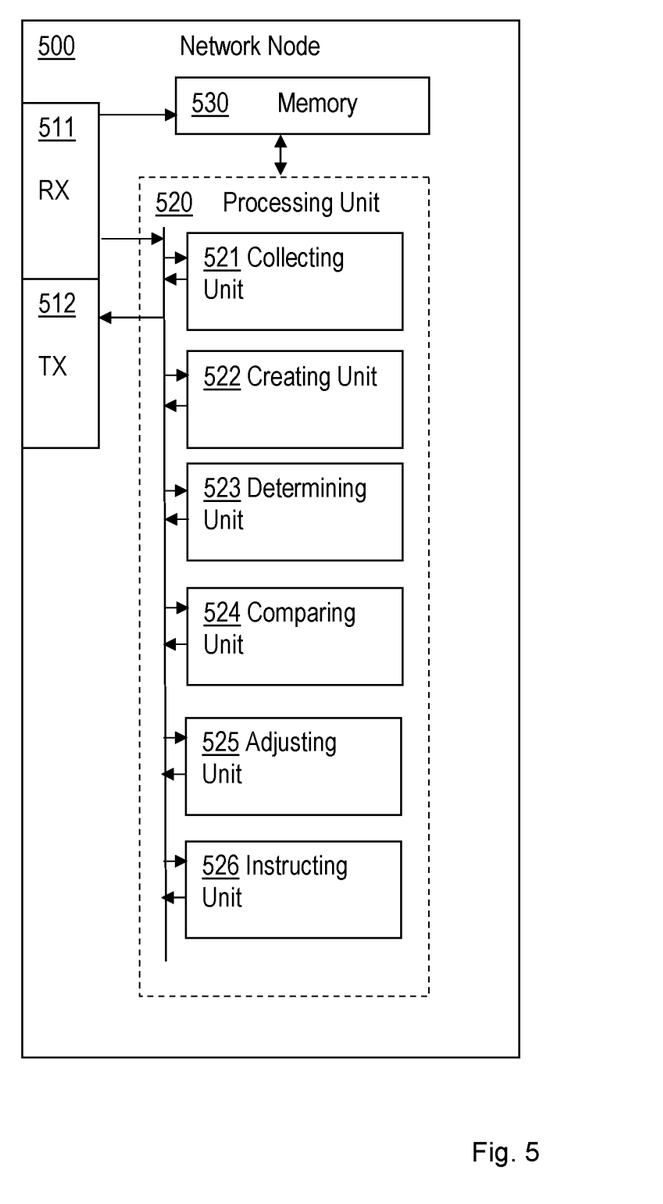
FIG. 5 is a block diagram of a network node adapted to control uplink power control according to still an exemplifying embodiment.

FIG. 5 a block diagram of a network node adapted to control uplink power control according to an exemplifying embodiment. FIG. 5 illustrates the network node 500 comprising a collecting unit 521 adapted to collect measurement reports from UEs being located within the area; and a creating unit 522 adapted to create clusters of low power RBS(s) and macro RBS(s) based on the collected measurement reports, wherein each cluster comprises one low power RBS and at least one macro RBS. The network node 500 further comprises a determining unit 523 adapted to determine a current uplink signal quality for the macro RBS based on a received report from the macro RBS. The network node 500 also comprises a comparing unit 524 adapted to compare the current uplink signal quality to a previously determined uplink signal quality. Still further, the network node comprises an adjusting unit 525 adapted to adjust a current uplink power control setting for the low power RBS based on the comparison; and an instructing unit 526 adapted to instruct UEs connected to the low power RBS to use the adjusted uplink power control setting.

The network node has several advantages. It may be possible to lower the interference level in the communication system and the total system capacity may be increased. It may also be possible to reduce the battery consumption for the UEs connected to the low power RBS.

According to an embodiment, the determining unit 523 is adapted to determine a current uplink signal quality for the low power RBS, wherein the adjusting unit 425 is adapted to adjust the current uplink power control setting for the low power RBS is also based on the current uplink signal quality for the low power RBS.

According to still an embodiment, the adjusting unit 525 is adapted to adjust the current uplink power control setting for the low power RBS downwards in case the comparison indicates a deteriorated uplink signal quality below a predefined threshold for UEs connected to the macro RBS.

According to yet an embodiment, the adjusting unit 525 is adapted to adjust the current uplink power control setting for the low power RBS in case the current uplink signal quality for the low power RBS is below a predefined threshold.

Figure 6:
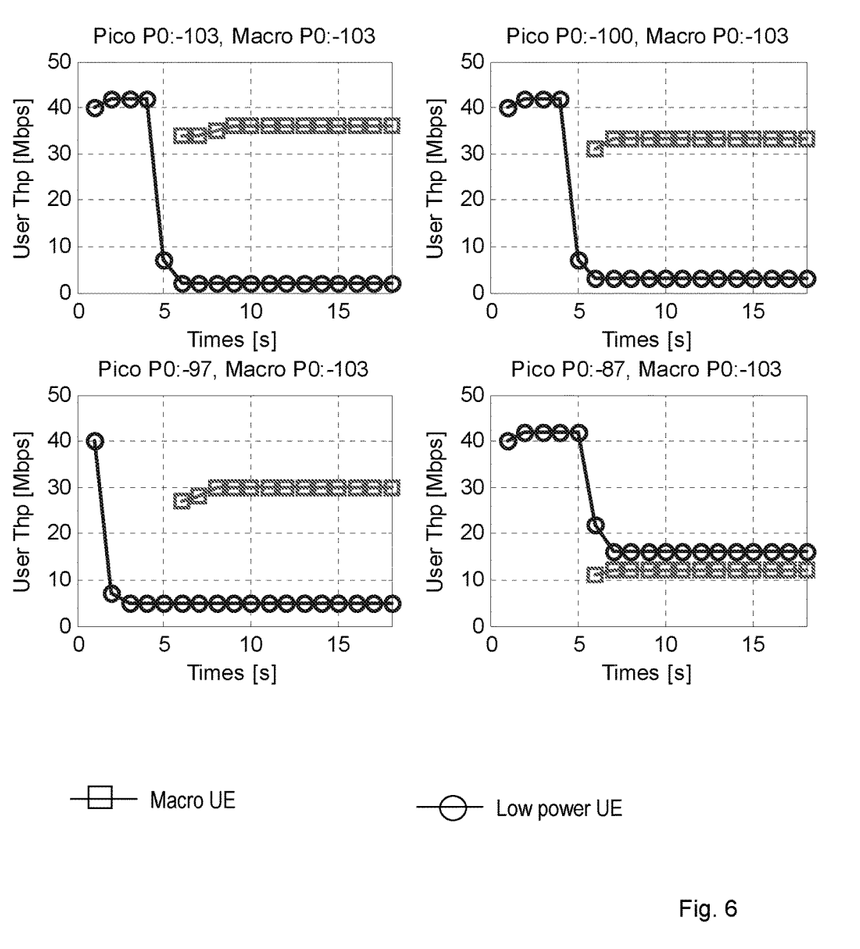
FIG. 6 illustrates how the performance change for a UE connected to a low power RBS with different uplink power settings.

FIG. 6 illustrates how the throughput performance change for UEs connected to a macro and a low power RBS when different uplink power target values are used in the pico. A macro UE located at the cell edge of the low power RBS causing strong interference in the low power RBS is started after four seconds. The macro UE causes a large dip in user performance and the difference in downlink power is 16 dB P0 is −103 dBm as default and the maximum uplink compensation for the low power RBS is P0=−87 dBm.

In FIG. 6, the macro uplink power control setting is constant in all four diagrams, namely −103 dBm. In the top left diagram, both the macro and the low power RBS employs a relatively low uplink power setting, namely −103 dBm. After 4 seconds, the macro UE starts transmitting in uplink and severely interferes with the low power UE. In the top right diagram, the uplink power setting is slightly increased for the UE connected to the low power RBS, i.e. the low power UE. P0=−100 dBm. In this scenario, the uplink signal quality for the low power UE are very slightly increased and the uplink signal quality for the macro UE is somewhat decreased. This is due to the low power UE transmitting with slightly higher output power which causes somewhat increased interference for the macro UE.

In the bottom left diagram, the uplink signal quality for the low power UE are increased more than before, now P0=−97 dBm, and the uplink signal quality for the macro UE is decreased a little more than before. In the bottom left figure, the low power UE has improved uplink signal quality without terribly interfering with the macro UE. The bottom right diagram illustrates a scenario when the uplink signal quality for the low power UE are increased even more which results in a substantial increase in uplink signal quality for the low power UE. However, the low power UE severely interferes with the macro UE which experiences a substantial decrease in uplink signal quality.

Figure 7:
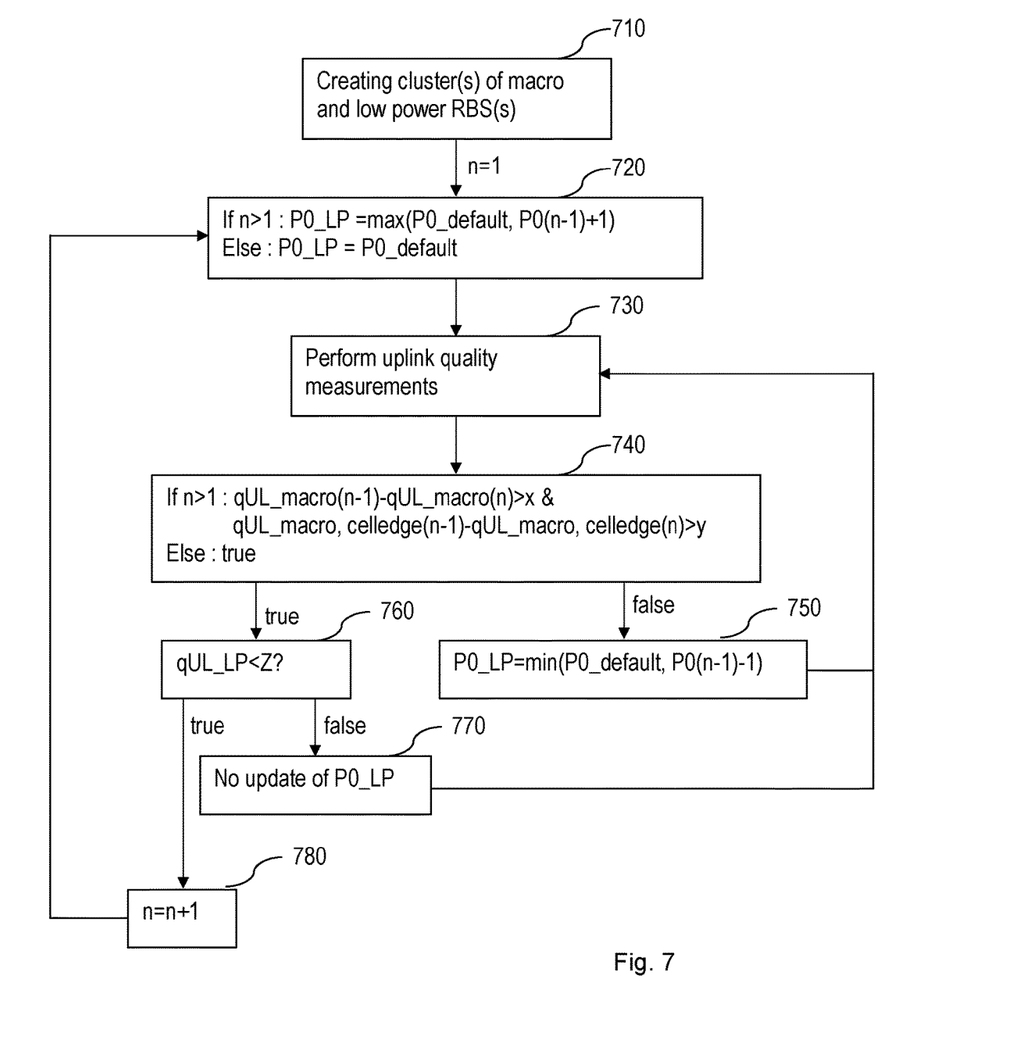
FIG. 7 is a flowchart of an exemplifying method for controlling uplink power control.

FIG. 7 is a flowchart of an exemplifying method, in a network node, for controlling uplink power control. It shall be pointed out that the method illustrated in FIG. 7 is an embodiment of the method 300 illustrated in FIG. 3. FIG. 7 illustrates the method comprising creating clusters 710 of one low power RBS and at least one macro RBS. In FIG. 7, once the cluster(s) have been created, a counter, n, is set to one. Then in the next step 720, n=1 and the uplink power control setting for the low power RBS, P0_LP, is set to a default value, denoted P0_default in FIG. 7.

Thereafter, uplink quality measurements are performed in step 730 and in step 740, n is still 1 so the method goes to step 760. In step 760, the network node checks if uplink quality measurements indicate that the uplink signal quality for the low power RBS is below a first predefined threshold, Z. If this condition is fulfilled, it means that the low power UE(s) experience substantial interference from the macro UE(s). However, if this is not the case, then the uplink power control setting for the low power RBS, P0_LP, does not require to be updated as illustrated in step 770 and the method goes back to step 730 to perform uplink quality measurements. The existing measurement reports that the UEs reports to the network when located close to the cell border as well as uplink quality measurements are used to determine an UL quality. Examples of measurement reports are measurements of UL Block Error Rate, BLER, UL Signal to Interference and Noise Ratio, SINR and UL throughput. Other quality measurements may alternatively or additionally be used in the macro and low power RBS respectively. At start the setting of P0 is the same in the macro and low power RBS. In case that the statements in step 740 is false, then the method goes to step 750 where P0 is set to the minimum value of the default value and a previous value of P0 minus 1. Thereafter, the method goes back to step 730 to perform uplink quality measurements.

However, if the uplink quality measurements indicate that the uplink signal quality for the low power RBS is below the first predefined threshold, Z, then the method goes to step 780 and increments the counter n. In this example, n now equals 2.

Thereafter, the method again goes to step 720 and checks in n is more than 1, which is true this time when N=2. Then the uplink power control setting for the low power RBS, P0_LP, is set to the maximum value of default value and the previous value of P0+1. In other words, now n=2, the previous uplink power control setting for the low power RBS, P0_LP, was the default value. So this check in step 720 this time when n=2 means that the P0_LP is set to the maximum of the default value or the default value +1. So the P0_LP is increased by 1.

Then uplink quality measurements are performed again in step 730. In step 740 it is checked if n is larger than 1, which is true since n=2, so then it is checked if the uplink signal quality for the macro according to the previous measurement minus the uplink signal quality for the macro according to a latest measurement is larger than a second predefined threshold, x. It is also checked if the uplink signal quality for the macro for a macro user at the edge of the cell according to the previous measurement minus the uplink signal quality for the macro for a macro user at the edge of the cell according to the latest measurement is larger than a third predefined threshold, y. If both these conditions are fulfilled, then the method goes to step 760 to check if uplink quality measurements indicate that the uplink signal quality for the low power RBS is below the first predefined threshold, Z, as described above. If one of the two conditions in step 740 is not fulfilled, then the the uplink power control setting for the low power RBS, P0_LP, is set to the minimum of the default value and the previous value of P0_LP minus 1. In other words, the P0_LP is reduced in case one of the conditions in step 740 is not fulfilled.

In FIGS. 4 and 5, the network node is also illustrated comprising a receiving unit 411, 511 and a transmitting unit 412, 512. Through these two units, the network node is adapted to communicate with other nodes and/or entities in the wireless communication network. The receiving unit 411, 511 may comprise more than one receiving arrangement. For example, the receiving unit may be connected to both a wire and an antenna, by means of which the network node is enabled to communicate with other nodes and/or entities in the wireless communication network. Similarly, the transmitting unit 412, 512 may comprise more than one transmitting arrangement, which in turn are connected to both a wire and an antenna, by means of which the network node is enabled to communicate with other nodes and/or entities in the wireless communication network. The network node further comprises a memory 430, 530 for storing data. Further, the network node is illustrated comprising a processing unit 420, 520 which in turns comprises the different modules 421-427, 521-526. It shall be pointed out that this is merely an illustrative example and the network node may comprise more, less or other units or modules which execute the functions of the network node in the same manner as the units illustrated in FIGS. 4 and 5.

It should be noted that FIGS. 4 and 5 merely illustrate various functional units in the network node in a logical sense. The functions in practice may be implemented using any suitable software and hardware means/circuits etc. Thus, the embodiments are generally not limited to the shown structures of the network node and the functional units. Hence, the previously described exemplary embodiments may be realised in many ways. For example, one embodiment includes a computer-readable medium having instructions stored thereon that are executable by the processing unit for executing the method steps in the network node. The instructions executable by the computing system and stored on the computer-readable medium perform the method steps of the embodiments as set forth in the claims.

FIGS. 4 and 5 schematically show embodiments of a network node 400, 500. Comprised in the network node 400, 500 are here a processing unit 420, 520, e.g. with a DSP (Digital Signal Processor). The processing unit 420, 520 may be a single unit or a plurality of units to perform different actions of procedures described herein. The network node 400, 500 may also comprise an input unit for receiving signals from other entities, and an output unit for providing signal(s) to other entities. The input unit and the output unit may be arranged as an integrated entity or as illustrated in the example of FIGS. 4 and 5, as one or more interfaces 411, 412, 511, 512.

Furthermore, the network node 400, 500 comprise at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 420, 520 in the network node 400, 500 causes the network node 400, 500 to perform the actions e.g. of the procedure described earlier in conjunction with FIGS. 2 and 3.

The computer program may be configured as a computer program code structured in computer program modules. Hence, in an exemplifying embodiment, the code means in the computer program of the network node 400 comprises a collecting unit for collecting measurement reports from UEs being located within the area; and a creating unit for creating clusters of low power RBS(s) and macro RBS(s) based on the collected measurement reports, wherein each cluster comprises one low power RBS and at least one macro RBS. The computer program further comprises an identifying unit for identifying the macro RBS with the lowest pathloss based on the collected measurement reports for those UEs being connected to the low power RBS and the level of the pathloss; and a determining unit for determining an interference level in the low power RBS caused by UEs being connected to the macro RBS based on the collected measurement reports for those UEs being connected to the macro RBS. The computer program further comprises a selecting unit for selecting uplink power control setting for the low power RBS based on the size of the pathloss associated with the identified macro RBS and the interference level in the low power RBS caused by UEs being connected to the macro RBS; and an instructing unit for instructing UEs connected to the low power RBS to use the selected uplink power control setting.

The computer program may be configured as a computer program code structured in computer program modules. Hence, in another exemplifying embodiment, the code means in the computer program of the network node 500 comprises a collecting unit for collecting measurement reports from UEs being located within the area; and a creating unit for creating clusters of low power RBS(s) and macro RBS(s) based on the collected measurement reports, wherein each cluster comprises one low power RBS and at least one macro RBS. The computer program further comprises a determining unit for determining a current uplink signal quality for the macro RBS based on a received report from the macro RBS; and a comparing unit for comparing the current uplink signal quality to a previously determined uplink signal quality. The computer program further comprises an adjusting unit for adjusting an uplink power control setting for the low power RBS based on the comparison; and an instructing unit for instructing UEs connected to the low power RBS to use the selected uplink power control setting.

The computer program modules could essentially perform the actions of the flow illustrated in FIGS. 2 and 3, to emulate the network node 400, 500. In other words, when the different computer program modules are executed in the processing unit 420, 520, they may correspond to the units 421-427, 521-526 of FIGS. 4 and 5.

Although the code means in the embodiment disclosed above in conjunction with FIGS. 4 and 5 are implemented as computer program modules which when executed in the processing unit causes the network node 400, 500 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node 400, 500.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, in a network node in a wireless communication network, for controlling uplink power control within an area comprising at least one macro Radio Base Station (RBS) and at least one low power RBS, the method comprising:
 collecting measurement reports from one or more user equipment (UE) located within the area;
 creating clusters of low power RBSs and macro RBSs based on the collected measurement reports, wherein each cluster comprises one low power RBS and at least one macro RBS;
 for each low power RBS in a cluster, identifying both a macro RBS with a lowest pathloss based on the collected measurement reports for those UE connected to the low power RBS and the level of the pathloss;
 determining, based on the collected measurement reports for those UE connected to the identified macro RBS, an interference level in the low power RBS caused by UE connected to the identified macro RBS;
 selecting an uplink power control setting for the low power RBS based on the size of the pathloss associated with the identified macro RBS and the interference level in the low power RBS caused by UE connected to the identified macro RBS; and
 instructing UE connected to the low power RBS to use the selected uplink power control setting.

2. The method of claim 1, wherein:
 the measurement reports comprise Reference Signal Received Power (RSRP); and
 the wireless communication network is employing Long Term Evolution (LTE).

3. The method of claim 1:
 further comprising estimating a traffic load in the low power RBS;
 further comprising weighting the pathloss associated with the identified macro RBS with the estimated traffic load; and
 wherein the selecting the uplink power control setting for the low power RBS is also based on the weighted pathloss.

4. The method of claim 1, further comprising:
 receiving information relating to transmission power of the identified macro RBS;
 determining pathloss based on the collected measurement reports for those UE connected to the low power RBS and the transmission power of the identified macro RBS.

5. The method of claim 1, wherein the network node is a low power RBS.

6. The method of claim 5, wherein collecting measurement reports from UE being located within the area comprises:
 receiving measurement reports from UE connected to the low power RBS; and
 receiving measurement reports from UE connected to one or more macro RBSs which have a pathloss to the low power RBS.

7. The method of claim 1, wherein the network node is an Operations, Administration and Maintenance (OAM) node.

8. The method of claim 1, wherein the network node is a Radio Network Controller (RNC) or a Base Station Controller (BSC).

9. The method of claim 1, wherein collecting measurement reports from the one or more UE located within the area comprises receiving measurement reports forwarded by the at least one macro RBS and the at least one low power RBS.

10. The method of claim 1, wherein the creating of clusters comprises:
 identifying, for each low power RBS, one or more macro RBSs having a lowest pathloss; and
 clustering each respective low power RBS with the one or more macro RBSs having the lowest pathloss.

11. The method of claim 1, wherein a first cluster of the clusters comprises a plurality of macro RBS that neighbor the low power RBS of the first cluster.

12. A method, in a network node in a wireless communication network, for controlling uplink power control within an area comprising at least one macro Radio Base Station (RBS) and at least one low power RBS, the method comprising:
 collecting measurement reports from one or more user equipment (UE), located within the area;
 creating clusters of low power RBSs and macro RBSs based on the collected measurement reports, wherein each cluster comprises one low power RBS and at least one macro RBS;
 for one or more macro RBSs of a cluster, determining a current uplink signal quality for the one or more macro RBSs based on a received report from the corresponding macro RBS;
 comparing a current uplink signal quality to a previously determined uplink signal quality;
 adjusting a current uplink power control setting for a low power RBS based on the comparison; and
 instructing UE connected to the low power RBS to use the adjusted uplink power control setting.

13. The method of claim 12:
 further comprising determining a current uplink signal quality for the low power RBS;
 wherein the adjusting the current uplink power control setting for the low power RBS is also based on the current uplink signal quality for the low power RBS.

14. The method of claim 13, wherein the current uplink power control setting for the low power RBS is adjusted upwards in response to the current uplink signal quality for the low power RBS being below a predefined threshold.

15. The method of claim 12, wherein the current uplink power control setting for the low power RBS is adjusted downwards in response to the comparison indicating a deteriorated uplink signal quality below a predefined threshold for UE connected to the macro RBS.

16. A network node, in a wireless communication network, adapted to control uplink power control within an area comprising at least one macro Radio Base Station (RBS) and at least one low power RBS, the network node comprising a processor and a memory, the memory containing instructions executable by the processor whereby the network node is configured to:
- collect measurement reports from one or more user equipment (UE) located within the area;
- create clusters of low power RBSs and macro RBSs based on the collected measurement reports, wherein each cluster comprises one low power RBS and at least one macro RBS;
- for each low power RBS in a cluster, identify a macro RBS with a lowest pathloss based on the collected measurement reports for UE connected to a low power RBS and the level of the pathloss;
- determine, based on the collected measurement reports for those UE connected to the identified macro RBS, an interference level in the low power RBS caused by UE connected to the identified macro RBS;
- select an uplink power control setting for the low power RBS based on both a size of the pathloss associated with identified macro RBS and the interference level in the low power RBS caused by UE connected to the corresponding macro RBS; and
- instruct UE connected to the low power RBS to use the selected uplink power control setting.

17. The network node of claim 16, wherein:
- the measurement reports comprise Reference Signal Received Power (RSRP); and
- the wireless communication network is employing Long Term Evolution (LTE).

18. The network node of claim 16, wherein the memory contains instructions executable by the processor whereby the network node is configured to:
- estimate a traffic load in the low power RBS;
- weight the pathloss associated with the identified macro RBS with the estimated traffic load; and
- select the uplink power control setting for the low power RBS also based on the weighted pathloss.

19. The network node of claim 16, wherein the memory contains instructions executable by the processor whereby the network node is configured to:
- receive information relating to the transmission power of the identified macro RBS; and
- determine the pathloss based on both the collected measurement reports for those UE being connected to the low power RBS and the transmission power of the identified macro RBS.

20. The network node of claim 16, wherein the network node is a low power RBS.

21. The network node of claim 20, wherein the memory contains instructions executable by the processor whereby the network node is configured to receive measurement reports from UE connected to the low power RBS and measurement reports from UE connected to one or more macro RBSs which have a pathloss to the low power RBS, thereby collecting measurement reports from UE located within the area.

22. The network node of claim 16, wherein the network node is an Operations, Administration and Maintenance (OAM) node.

23. The network node of claim 16, wherein the network node is a Radio Network Controller (RNC) or a Base Station Controller (BSC).

24. The network node of claim 16, wherein the memory contains instructions executable by the processor whereby the network node is configured to collect measurement reports from UE located within the area by receiving measurement reports forwarded by the at least one macro RBS and the at least one low power RBS.

25. The network node of claim 16 wherein the memory contains instructions executable by the processor whereby the network node is configured to:
- identify, for each low power RBS, one or more macro RBSs having lowest pathloss; and
- cluster each respective low power RBS with one or more corresponding macro RBSs having the lowest pathloss.

26. A network node, in a wireless communication network, configured to control uplink power control within an area comprising at least one macro Radio Base Station (RBS) and at least one low power RBS, the network node comprising a processor and a memory, the memory containing instructions executable by the processor whereby the network node is configured to:
- collect measurement reports from one or more user equipment (UE) located within the area;
- create clusters of low power RBSs and macro RBSs based on the collected measurement reports, wherein each cluster comprises one low power RBS and at least one macro RBS;
- for one or more macro RBSs of a cluster, determine a current uplink signal quality for the one or more macro RBSs based on a received report from the corresponding macro RBS;
- compare a current uplink signal quality to a previously determined uplink signal quality;
- adjust a current uplink power control setting for a low power RBS of the cluster based on the comparison; and
- instruct one or more UE connected to the low power RBS to use the adjusted uplink power control setting.

27. The network node of claim 26, wherein the memory contains instructions executable by the processor whereby the network node is configured to:
- determine a current uplink signal quality for the low power RBS; and
- adjust the current uplink power control setting for the low power RBS based on the current uplink signal quality for the low power RBS.

28. The network node of claim 26, wherein the memory contains instructions executable by the processor whereby the network node is configured to adjust the current uplink power control setting for the low power RBS downwards in response to the comparison indicating a deteriorated uplink signal quality below a predefined threshold for UE connected to the macro RBS.

29. The network node of claim 26, wherein the memory contains instructions executable by the processor whereby the network node is configured to adjust the current uplink power control setting for the low power RBS in response to the current uplink signal quality for the low power RBS being below a predefined threshold.

* * * * *